C. TRUITT.
THERMOSTATIC CONTROLLER FOR ELECTRICALLY HEATED DEVICES.
APPLICATION FILED FEB. 4, 1914.
1,209,234. Patented Dec. 19, 1916.
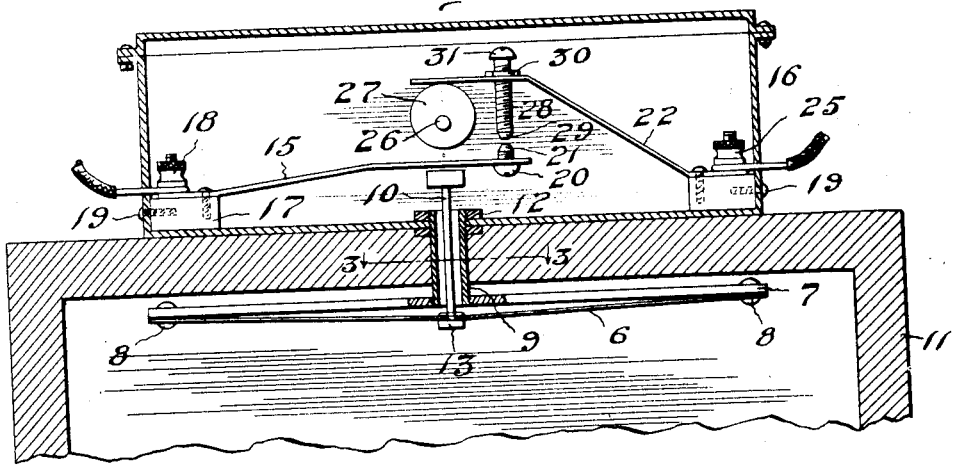
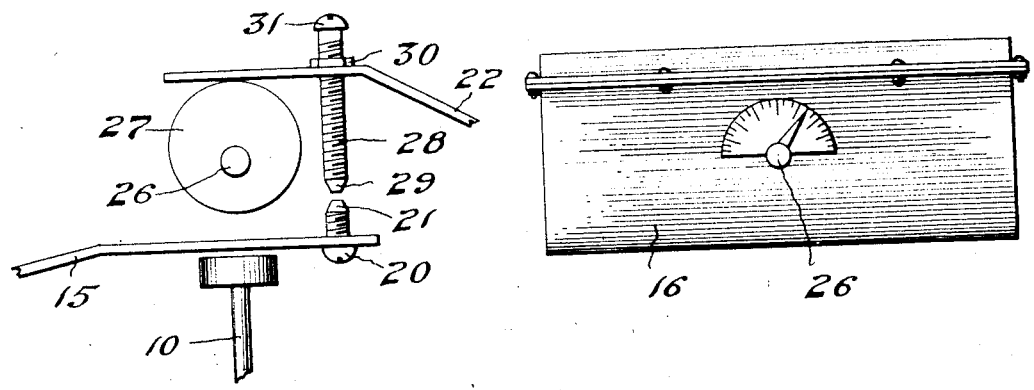
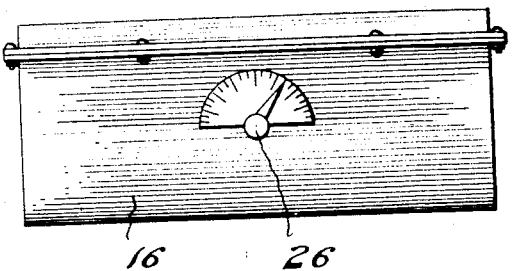
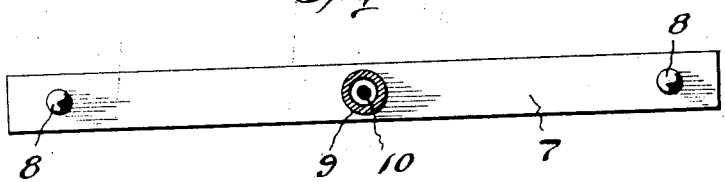
Witnesses
J. W. Michael, Jr.
M. E. Clark.
Inventor
Clarence Truitt
By Edson Bro's
Attorneys

UNITED STATES PATENT OFFICE.

CLARENCE TRUITT, OF POMONA, CALIFORNIA.

THERMOSTATIC CONTROLLER FOR ELECTRICALLY-HEATED DEVICES.

1,209,234.  Specification of Letters Patent.  Patented Dec. 19, 1916.

Application filed February 4, 1914. Serial No. 816,617.

*To all whom it may concern:*

Be it known that I, CLARENCE TRUITT, whose post-office address is 531 North Gordon street, Pomona, California, a citizen of the United States, residing at Pomona, in the county of Los Angeles and State of California, have invented certain new and useful Improvements in Thermostatic Controllers for Electrically-Heated Devices; and I do hereby declare the following to be a full, clear, and exact description of the invention, such as will enable others skilled in the art to which it appertains to make and use the same.

This invention is a thermostatic controller for electrically heated devices.

Heretofore the control of the heat production in electrically heated devices has been by the step by step, or by the series-parallel method, neither method allowing sufficient graduation of the heat evolved, or range in temperatures. The heating element is usually subdivided into two or more parts, and taps or leads are brought out from the subdivisions to a switch having several contact points. This method involves much extra work in assembling of the heating element and its connections. The subdividing of the heating element is, many times, wasteful of the electric current, as just the right temperature is not obtained, or maintained by the heating element. The introduction of a resistance into an electrical circuit to vary the amount of current passed is also wasteful.

To avoid these objections in obtaining the proper amount of heat produced, and to maintain the temperature at the required degree, this invention contemplates the use of a thermostatic control, through which the required temperature will be maintained at any and all times, by allowing sufficient current to pass to the heating element as a unit. The entire heating element is thus utilized to give off the required number of heat units to maintain the required, or predetermined temperature.

Another aim of this invention is to provide a control that will eliminate the subdividing of the heating element, the extra leads connected to the switch points, and which will utilize the heating element as an entire unit.

Another object is to provide a control to give a complete range of temperatures from the minimum to the maximum.

A still further object is to provide a control which will permit the maximum amount of the electric current to pass when the heating element is cold, or the temperature lowered, but when the element is operating to produce the maximum number of heat units, the current will be automatically cut-off, or the circuit broken, following a rise in temperature which exceeds a predetermined number of degrees.

Another object of this invention is to provide a simple, cheap, effective and positive control of the temperature, one that will not waste the electric current, or need costly repairs or replacements, and one by means of which the user may vary the temperature to suit existing conditions.

With these objects in view, the invention consists of a thermostat to control the passage of an electric current to a heating element, by the movement of separable contacts, and a member which is adapted to vary and also maintain the amount of the separation of the contacts.

In the drawings, forming a part hereof,—Figure 1 is a vertical sectional view of an oven with the device attached. Fig. 2 is an enlarged view of the separating members and the contacts. Fig. 3 is an enlarged sectional view through the longitudinal axis of the thermostat, the supporting member, and the plunger portion. Fig. 4 is a side elevation of a part of the device disclosing the external indicating means.

The thermostat is preferably of the type that depends upon the different ratios of expansion of dissimilar metals, taking for example, brass and steel, and is usually located within the interior of a chamber, such as an oven 11, shown in Fig. 1. This thermostat, as shown in elementary form, is composed of a strip of brass 6, and a strip of steel 7, that are joined by the rivets, or other means of fastening 8. By rigidly connecting the two metals together in this or a similar manner, the brass strip, through the action of the heat, is caused to have a movement relative to the steel strip.

At a suitable point between the ends of the steel strip 7, is an aperture, which is preferably threaded. The hollow sleeve or tube 9, may have one end threaded as shown to engage with the threads formed in the aperture. In the one embodiment shown, the upper end of the tube 9, is also threaded and secured to a wall of the oven 11, and to the switch gear box 16, by any suitable means, such as the lock nut 12, which engages with the threaded portion of the tube in the manner shown, to retain the tube rigidly at an angle with the wall. Through this tube 9, there freely passes a plunger 10, that is adapted to be removable. For example, a portion of the plunger may be threaded to correspond to a suitable threaded aperture in the strip and a lock nut 13 to hold the strip and plunger rigidly together, and also allow the plunger to project at an angle with reference to the strip 6. At one end of the plunger 10, is a relatively large head composed of material that is a non-conductor of the electric current, which bears against a resilient member of metal 15, such as spring brass for example. One end of this member is preferably mounted on a block 17, that is composed of insulating material, by means of the screw 18, shown in Fig. 2. This block 17 is also secured to a wall of the switch box 16, by any usual means, such as is shown by the screw 19. Located near the free end of the resilient member 15, projects a holder 20, which is preferably threaded for engagement with a suitably threaded aperture in the member 15 to permit of adjustment of the holder 20. One end of this holder is adapted to receive a removable point 21, that may be composed of some metal such as platinum, which is not readily "burned", or oxidized by the action of the electric current, when the circuit is broken, though for cheapness copper may be used, as well as a non-metal, such as carbon. This contact is made removable for the purpose of replacements that may be necessary in the course of use. For use in an oven adapted to household or domestic purposes, small replacements of this character would tend to make the user more familiar with the construction of the device, and obviate the necessity of requiring the services of a trained worker for minor repairs.

The resilient member 22, which is shown as being oppositely positioned with reference to the member 15, is secured in a similar manner to the switch box 16 to that of the member 15. Disposed upon the member 22 is a holder 28, that is preferably threaded for the purpose of adjustment. One end of this holder is also adapted to receive a removable point 29, which also may be made of similar, or other material, to that of the point 21, carried by the holder 20. In order to permit the holder 28 to pass through the member 22, an aperture is provided having a suitably threaded portion to engage with the threaded portion of the holder, and to retain the holder in a locked position after adjustment, a lock nut 30 is provided as shown in Fig. 2. The head 31 of the holder 28 is usually made of a shape similar to the common slotted round head screw head, though it may be found preferable to make it of any other shape.

The holders 20 and 28 are so disposed that they travel to and from each other in the same relative plane, in order that the points 21 and 29 will contact with each other when in the operating position to complete the electrical circuit of which they form a part.

A certain amount of adjustment is had by the adjusting holder 28, but in the embodiment as shown in Fig. 2, the adjustment for temperature is had by means of the shaft 26, that carries the cam-like wheel, or eccentrically placed disk 27, which is formed of insulating material. This shaft 26 is rotatably mounted in any suitable manner, and the wheel or disk 27 that is preferably eccentrically mounted upon the shaft in some secure way, is so located between the members 15 and 22 that it will raise or limit the movement of the member 22, depending on whether or not the shaft is revolved or is stationary. By revolving this shaft, the contact points 21 and 29 are separated more or less, depending upon the direction of the longest axis of the eccentric, or the eccentricity of the wheel 27.

The screws 18 and 25 may be employed as binding posts for electrical connection to the circuit, supplying electricity to the device, though it may be found preferable to have the connecting points located on the exterior of the box 16.

The switch gear box 16 may be made of any suitable material, such as sheet-iron, and is used for the purpose of inclosing and projecting the switching gear and its internal connections.

In operation, the current may enter through either wall of the box 16, so that it may be connected to one of the resilient members. If the current enters through the right hand wall, it is connected to the member 22, passes through it to the holder 28, thence to the point 29, to the point 21 to the holder 20, to the member 15, and to the connecting point 18; from that point it is connected to the heating element, which is not shown. Thus it will be seen that the device is placed in series with the circuit and the heating element. The normal position of the thermostat and the members 15 and 22, with their corresponding holders 20 and 28, is to place the points carried by the holders in contact relation, to keep the circuit closed for the passage of the electric current. But when the temperature exceeds, or rises and passes beyond a predetermined degree, the brass strip 6 sags, drawing down the plunger 10, permitting the member 15 to be depressed. This depression of the member 15 and the plunger causes the points 21 and 29 to be separated, by which action the circuit is broken and the current interrupted. The member 15 and the brass strip 6 react toward each other in such a manner that by the action of the heat upon the brass strip it will sag, or lessen the force with which the strip reacts upon the member 15. It is necessary in this instance to have the forces acting on the plunger unbalanced, in order that the plunger 10 and the member 15 will tend to separate the contacts by the action of the heat on the part 6. The wheel or cam-like member 27, that is located between the members 15 and 22, determines the distance through which the points 21 and 29, will travel before breaking the circuit. This distance might be termed the time-heat element portion of the switch gear, gives substantially a perfect control of the heat evolved and the temperature desired. If the point of the least eccentricity of the disk or wheel 27, is at the top, then the member 22 will follow the member 15 through a greater distance, when the plunger 10 is lowered by the thermostat. The member 15 naturally travels through a greater distance than the member 22, though if in the construction shown, the upward pressure of the thermostat, to the member 15 is greater than that exerted by the member 22, then the point 29 will travel through a relatively greater distance. Thus a higher temperature is required in the chamber to cause the thermostat to move sufficiently to separate the point and thereby break the circuit. If on the other hand, the amount of the greater eccentricity be at the top, then the thermostat is caused to move through its smallest distance by the least amount of heat produced. Thus it will be seen that the temperature may be kept at its maximum or minimum, or at any degree intermediate of the extremes, depending upon the position of the wheel 27. After the circuit has been opened and the temperature falls slightly below or to the necessary degree, the thermostat then operates to close the circuit, or to reëstablish it. The operation of closing is the reverse of opening, and begins with the thermostat raising the plunger 10, causing the head 14 to bear against the member 15, which in turn places the point 21 in contact relation with the point 29, thereby completing the circuit. A very sensitive thermostat may be used in conjunction with the switch gear to control the movement of the members and their points, and therefore the temperature will not appreciably vary from that desired. As the circuit is caused to be made and broken by the expansion or contraction of, or the movement communicated by the thermostat, this operation permits only sufficient current to pass to the heating element for such a length of time as will produce the predetermined degree of temperature, and thus automatically control the heat units evolved by the heating element. By this method the entire heating element is utilized for heating purposes, and by the movement of the part 27, places in the hands of the user a very simple and effective control of the temperature from a maximum to a minimum.

It will be understood that minor changes in form and construction may be made that will fairly fall within the scope of the appended claims, without departing from the spirit of the invention.

What I claim is:

1. In a thermostatic controller for electrically heated devices, a thermostat, a plurality of resilient contact carriers, each of said carriers being provided with an adjustable and removable contact element, one of said contact elements being oppositely positioned to another of said elements, and rotatable means interposed between said carriers to limit the movement and vary the position of one of said carriers.

2. A thermostatic controller for electrically heated devices comprising a thermostatic element having a plunger connected therewith for movement by said element, a plurality of resilient contact carriers arranged in spaced relation and each carrier provided with removable contact elements, said contact carriers being maintained in various predetermined spaced positions by a manually controlled rotatable cam interposed between the opposing free ends of the contact carriers and adjacent the contact elements, the plunger of the thermostatic element operating to move one of the contact carriers so that the contact elements may be brought into contact relation.

3. In a thermostatic controller for electrically heated devices, a plurality of contact carriers, and a rotatable disk eccentrically mounted and positioned between said carriers to coöperate with one of said carriers, and a thermostat to coöperate with another of said carriers.

4. In a thermostatic controller for electrically heated devices, a thermostat, a plurality of resilient contact carriers having a plurality of contact elements mounted thereon, one of said contact elements being positioned oppositely to and normally in contact relation with another of said contact elements, rotatable means positioned between said contact carriers to limit the movements and vary the contact relations of said carriers, and a plunger element coöperating with one of said carriers and said thermostat, whereby the effect of the variations of sensible heat above and below a predetermined temperature are directly caused to vary the positions of said contact elements and said carriers to maintain the production of heat at a predetermined and the desired temperature.

5. In a thermostatic controller for electrically heated devices, a plurality of resilient contact carriers, each being fixedly secured at one end and provided with coöperating spaced contact elements near the free ends of the carriers, and a thermostatic element comprising a plurality of metallic plates connected at their ends, one of which plates is movable and sensible to heat, said movable plate being provided with a plunger secured thereto which is adapted to engage one of the resilient contact carriers to produce a contact between the contact elements of the carriers.

In testimony whereof, I affix my signature, in presence of two witnesses.

CLARENCE TRUITT.

Witnesses:
INEZ PAYTON,
L. E. SHEETS.